United States Patent [19]

Langford, Jr., deceased et al.

[11] Patent Number: 5,224,271

[45] Date of Patent: Jul. 6, 1993

[54] LEVELING TEST APPARATUS AND METHOD FOR OPTICAL INSTRUMENT

[76] Inventors: Horace B. Langford, Jr., deceased, late of Perry; by Dixie L. Langford, heir, 809 N. QuincySt., Perry, Fla. 32347; Donna C. Langford, 160 Crenshaw Dr., #12, Tallahasse, Fla. 32310

[21] Appl. No.: 904,470

[22] Filed: Jun. 25, 1992

[51] Int. Cl.⁵ .............................................. G01C 15/00
[52] U.S. Cl. ...................................... 33/293; 33/295; 33/228
[58] Field of Search ................. 33/293, 294, 295, 296, 33/290, 228

[56] References Cited

U.S. PATENT DOCUMENTS

| | | | |
|---|---|---|---|
| 624,362 | 5/1899 | Millikin et al. | 33/294 |
| 2,058,998 | 10/1936 | Koulichkov | 33/296 |
| 3,374,545 | 3/1968 | Monroe | 33/293 |
| 4,060,909 | 12/1977 | Collins et al. | 33/296 |
| 4,356,637 | 4/1982 | Hall | 33/296 |
| 4,471,532 | 9/1984 | Francis | 33/294 |

FOREIGN PATENT DOCUMENTS

| | | | |
|---|---|---|---|
| 988211 | 4/1965 | United Kingdom | 33/294 |
| 2017913 | 10/1979 | United Kingdom | 33/293 |

OTHER PUBLICATIONS

"Field Equipment", Keuffel & Esser Co. Catalog 11, 1975, pp. 5, 11-18, 27.

*Primary Examiner*—William A. Cuchlinski, Jr.
*Assistant Examiner*—Alvin Wirthlin

[57] ABSTRACT

This invention is a test apparatus and method for noting whether the axis of sight of an optical instrument is parallel to the axis of a horizontal bubble level of that instrument. The apparatus has: (1) a vertically elongated first scale facing in one direction; and (2) a similarly calibrated second scale closely parallel to the first scale and facing in the opposite direction and selectively adjustable along the first scale. In the present method, first, the optical instrument is leveled midway between two such test apparatuses about 200 feet apart, with their respective second scales facing each other. Using the instrument, readings are taken on these second scales. Then the second scale of one test apparatus is adjusted along its first scale to a position thereon which matches the reading just taken on the second scale of the other test apparatus. Next the optical instrument is leveled at a position close to either test apparatus on the opposite side of it from the other test apparatus. Readings now are taken on the first scale of the closer test apparatus and on the second scale of the more distant test apparatus.

11 Claims, 3 Drawing Sheets

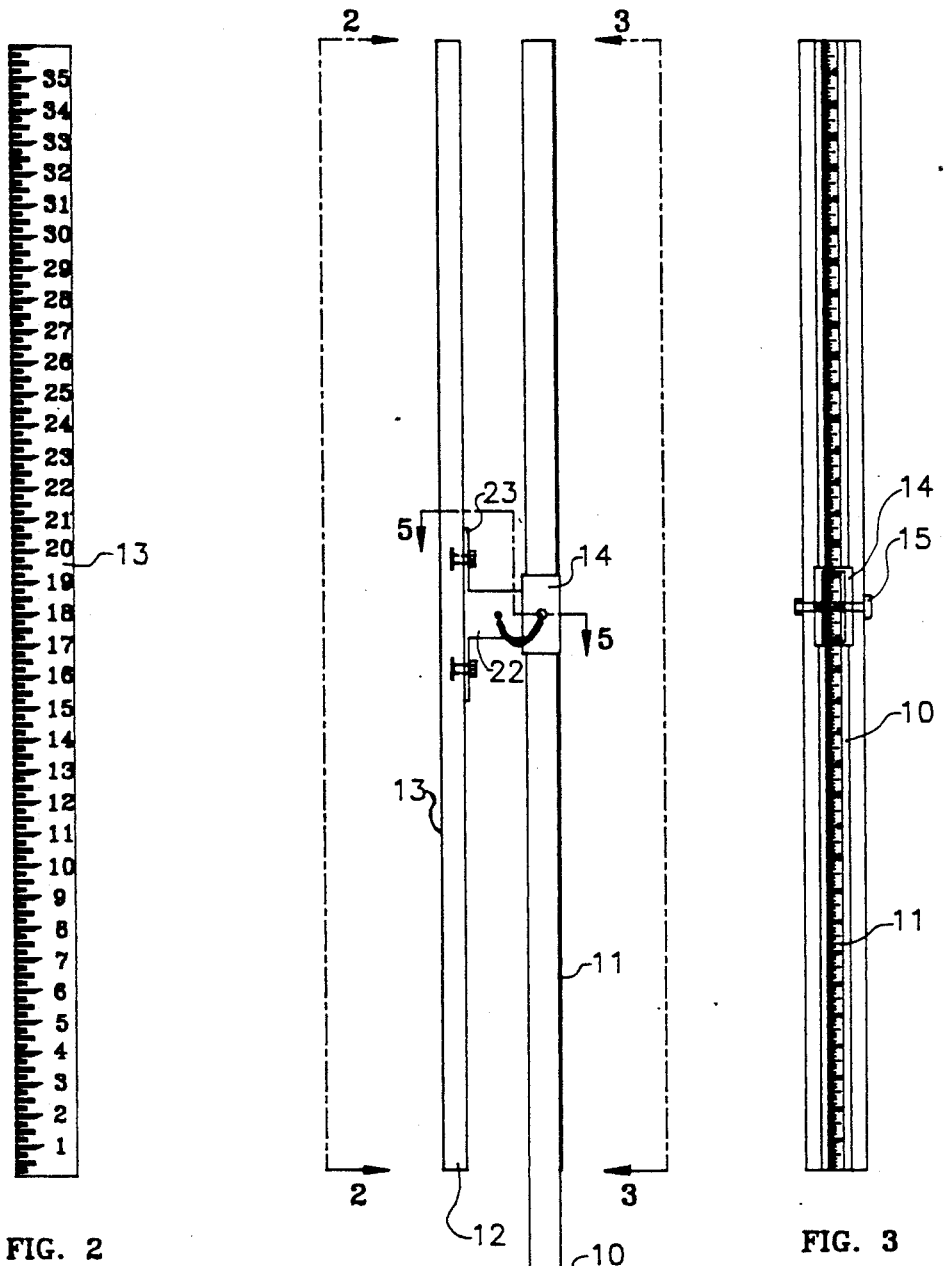
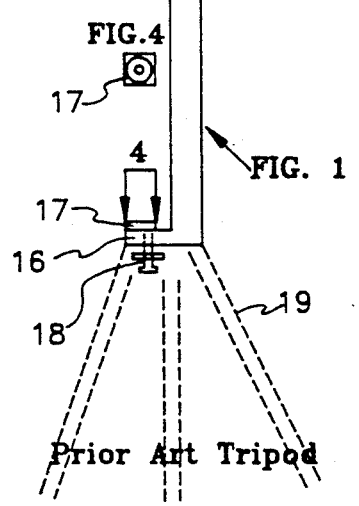
FIG. 2
FIG. 3
FIG. 1
Prior Art Tripod

Prior Art Method

LEVELING TEST APPARATUS AND METHOD FOR OPTICAL INSTRUMENT

This invention relates to a leveling test apparatus and method for an optical instrument (such as a transit or a theodolite) having a horizontal bubble level with an axis parallel to the instrument's line of sight.

BACKGROUND OF THE INVENTION

FIG. 8 illustrates schematically the well-known "peg adjustment" method for noting whether the axis of sight of the telescope of an optical instrument is parallel to the axis of any horizontal bubble level of that instrument.

In accordance with this prior art method, a standard in the form of a rigid elongated rod is positioned first at a stake A embedded in the ground (called a "peg") and thereafter at a similar ground-embedded peg B. Typically, pegs A and B are about 200 feet apart. The rod carries a scale which extends longitudinally of the rod and is calibrated in inches or other chosen increments of distance. A person holds the rod on the ground-embedded peg so that the rod extends vertically up from the ground. An optical instrument being tested, such as a transit T, first is leveled at a point C midway between pegs A and B and is used to read the scale marks on the rod at the axis of sight X of the instrument's telescope. As shown in FIG. 8, the scale reading on the rod when it is held vertical on peg A is a distance a1 up from the ground and the scale reading on the rod when it is held vertical on peg B is a distance b1 up from the ground. The difference between the readings (b1−a1) represents the difference in elevation between the respective ground locations of pegs B and A even though the optical instrument's axis of sight X might not be horizontal.

Next the optical instrument is set up and leveled close to peg A on the opposite side of it from peg B. With the calibrated rod held vertical on peg A and the eyepiece of the optical instrument within inches of the rod, a reading a2 is taken on the rod by sighting through the objective lens end of the instrument's telescope. Then the calibrated rod is moved to the now-remote peg B and held vertical on peg B while the optical instrument is used in the usual way to take a reading b2 on the rod. If the instrument's axis of sight is horizontal, the reading b2 should equal the reading a2 plus the difference in elevation between the ground locations of pegs A and B—that is, (b1−a1)+a2.

This prior art method requires at least two persons to carry it out—one to use the optical instrument and the other to hold the calibrated rod vertical, first on peg A while reading a1 is taken, then on peg B while reading b1 is taken, next on peg A again while reading a2 is taken, and finally on peg B again while reading b2 is taken.

SUMMARY OF THE INVENTION

This invention relates to a leveling test apparatus and method which can be used instead of the "peg adjustment" method of the prior art to determine whether the axis of sight of an optical instrument, such as but not limited to a transit or a theodolite, is parallel to the axis of any horizontal bubble level of that instrument. Two test apparatuses in accordance with the present invention are used to perform the novel method of this invention. One person can perform the present method. The test apparatus of the present invention is readily portable and can be used over and over again.

A principle object of this invention is to provide a novel leveling test apparatus for determining whether the axis of sight of an optical instrument, such as a transit or a theodolite, is parallel to the axis of a horizontal bubble level of that instrument.

Another principal object of this invention is to provide a novel method of testing such an optical instrument to determine whether its axis of sight is parallel to the axis of a horizontal bubble level of that instrument, using two test apparatuses according to the present invention.

Further objects and advantages of this invention will be apparent from the following detailed description of a presently preferred embodiment shown in the accompanying drawings.

Preferably, the test apparatus of the present invention comprises a tripod-mounted, rigid, elongated rod carrying on one side a first scale calibrated in inches or other chosen increments of distance and carrying at its lower end a bubble level to indicate whether the rod extends vertically up from the tripod, an elongated support member extending parallel to the rod and carrying a similar second scale which faces away from the rod, a sleeve slidable along the rod and rigidly attached to the support member, a marker on the sleeve pointing to the first scale on the rod to designate the sleeve's position along the rod, a clamping screw on the sleeve for releasably clamping it in any selected position along the rod, and a locking bolt for releasably locking the sleeve at a centered position along the rod.

In accordance with the method of the present invention, two such test apparatuses are positioned a substantial distance apart on a substantially level surface and with their respective second scales facing each other. The optical instrument to be tested is positioned on that surface midway between the test apparatuses and is used to take readings on their respective second scales. The sleeve on one of the test apparatuses is adjusted vertically along the rod of that apparatus to position its marker at the scale reading of its first scale which corresponds to the just-taken scale reading of the second scale of the other test apparatus. Then the optical instrument being tested is leveled on the support surface within about 25 feet of the test apparatus whose sleeve has just been adjusted and on the opposite side of that test apparatus from the test apparatus whose second scale was not so adjusted. The optical instrument is used to take readings on the first scale of the closer test apparatus and the second scale of the farther test apparatus. These readings should be the same if the optical instrument's axis of sight is horizontal.

DESCRIPTION OF THE DRAWINGS

FIG. 1 is an elevational view of the present test apparatus on a tripod of known design, the upper end of which is shown in phantom;

FIG. 2 is a front view taken from the line 2—2 at the left side of FIG. 1 and showing the adjustable second scale;

FIG. 3 is a rear view taken from the line 3—3 at the right side of FIG. 1 and showing the first scale and the slidably adjustable sleeve in the test apparatus;

FIG. 4 is a view taken from the line 4—4 in FIG. 1, looking down on the bubble level at the lower end of the test apparatus;

Figure 5:
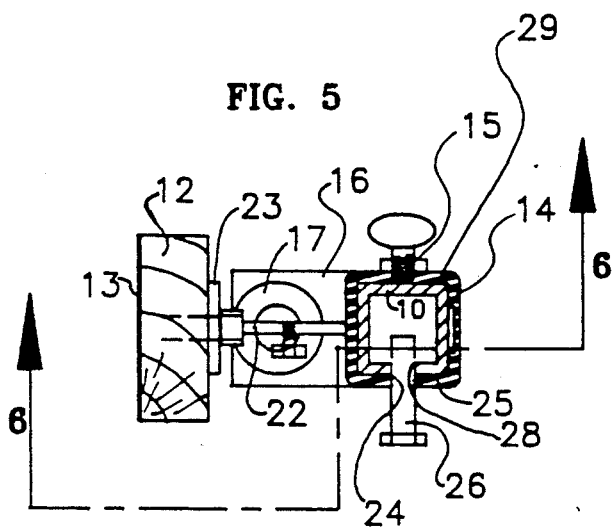
FIG. 5 is a horizontal cross-section taken along the line 5—5 in FIG. 1 at the sleeve.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Apparatus

As best seen in FIG. 1, in broad outline the present test apparatus comprises a rigid, elongated, vertically positioned rod 10 carrying a calibrated first scale 11 on one side, a rigid, elongated, adjustable member 12 extending parallel to the rod 10 and carrying a similarly calibrated second scale 13 on the side away from the rod 10, a slider in the form of a sleeve 14 rigidly coupled to the adjustable member 12 and slidably adjustable along rod 10, and a clamping bolt 15 (FIGS. 3, 5 and 7) screw-threadedly mounted on sleeve 14 and selectively engageable with rod 10 to clamp the sleeve at a selected position along the rod.

As shown, the rod 10 is a rigid metal tube of square cross-section (FIG. 5), preferably aluminum. It has a flat integral foot 16 at its lower end (FIG. 1) which extends perpendicular to the length of the rod and projects out laterally on the opposite of the rod from its scale 11. A bubble level 17 of known design is mounted on top of the foot 16 to enable the user to position the rod 10 vertical. The foot 16 is clamped by a clamp 18 of known design to the top of a conventional tripod, the upper end of which is shown in phantom at 19 in FIG. 1. If desired, a different base may be used in place of the tripod to support the rod 10 from the ground or other support surface, but the tripod is considered ideal for this purpose because of its light weight, collapsibility and stability. The first scale 11 is calibrated in inches and fractions thereof, and is 36 inches long in one practical embodiment of the invention.

The adjustable member 12 of the present test apparatus is an elongated rectangular block of wood. The second scale 13 also is calibrated in inches and fractions of an inch, and is 36 inches long. As already mentioned, the second scale 13 is on the opposite side of adjustable member 12 from the rod 10 so that it faces in the opposite direction from the first scale 11.

Figure 6:
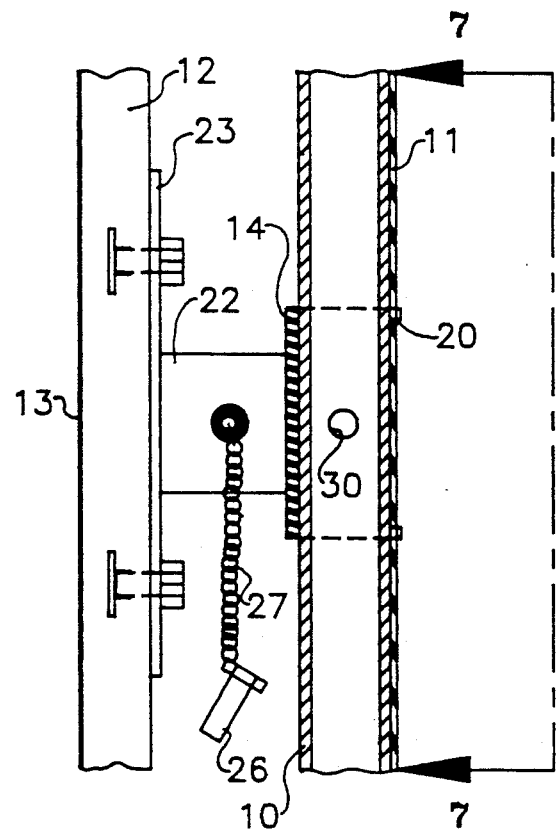
FIG. 6 is a partial cross-sectional view taken along the line 6—6 in FIG. 5 through the rod which carries the first scale.

The slider sleeve 14 is of generally square cross-section so as to have a close, sliding fit on the outside of rod 10. As shown in FIG. 5, the slider sleeve 14 slidably engages the rod 10 on all sides of the rod. On the side which overlies the first scale 11, the sleeve has a vertically elongated, wide, first opening 20 (FIG. 7) at which the first scale 11 is visible. Midway up along this opening the sleeve presents a visible line 21 or other marker next to the first scale 11. The opposite side of the sleeve 14 from the side where its opening 20 is located is rigidly connected to a cross piece 22 (FIGS. 4, 5 and 6) jointed to a flat plate 23 that is bolted to the adjustable member 12. In this manner the adjustable member 12 is rigidly affixed to sleeve 14.

Figure 7:
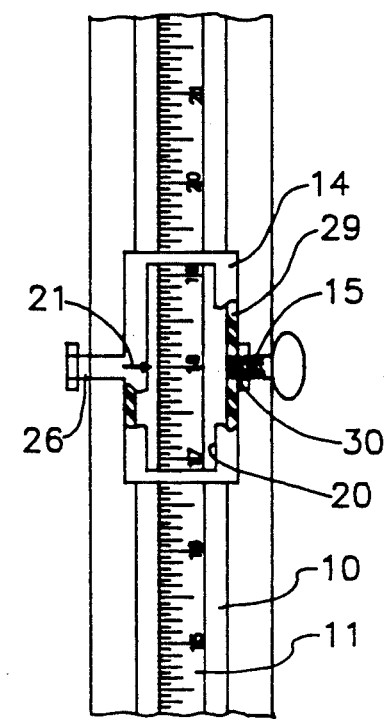
FIG. 7 is a rear view taken generally from line 7—7 in FIG. 6 showing the sleeve, partly in side elevation and partly broken away clamped to this rod.
Figure 8:
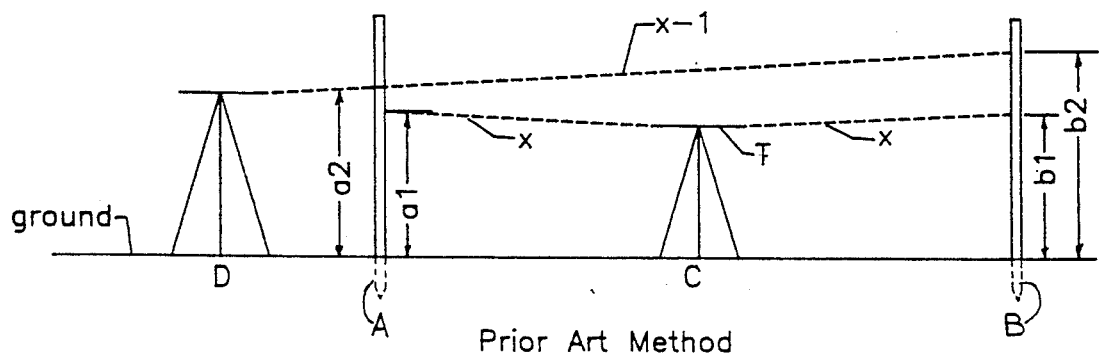
FIG. 8 is a schematic elevational view showing the "peg adjustment" method of the prior art.

The sleeve 14 has a small, circular, second opening 24 (FIG. 5) in one of its side walls 25 between the side having the vertically elongated first opening 20 and the side to which the cross piece 22 is connected. The axis of opening 24 is aligned with the marker line 21 on sleeve 14 (FIG. 7). A locking pin 26 for reception in the second opening 24 is on one end of a short chain 27 (FIG. 6), the opposite end of which is attached to cross piece 22. The corresponding side of the rod 10 has an opening 28 (FIG. 5) with which the sleeve opening 24 registers when the marker line 21 on sleeve 14 is aligned with the midpoint of the first scale 11. The locking pin 26 can be slidably inserted through the sleeve opening 24 into the rod opening 28 to hold the sleeve 14 in a centered position along the first scale 11, initially. Thereafter, the locking pin 26 can be slidably removed from these openings to permit the adjustment of sleeve 14 up or down along the rod 10.

The opposite side 29 of the sleeve 14 has a screw-threaded third opening 30 (FIGS. 6 and 7) which threadedly receives the clamping screw 15. When the locking pin 26 is removed and the clamping screw 15 is loosened, the sleeve 14 may be adjusted up or down along the rod 10, after which the clamping screw 15 may be tightened to clamp the sleeve in the new position.

Method

Figure 9:
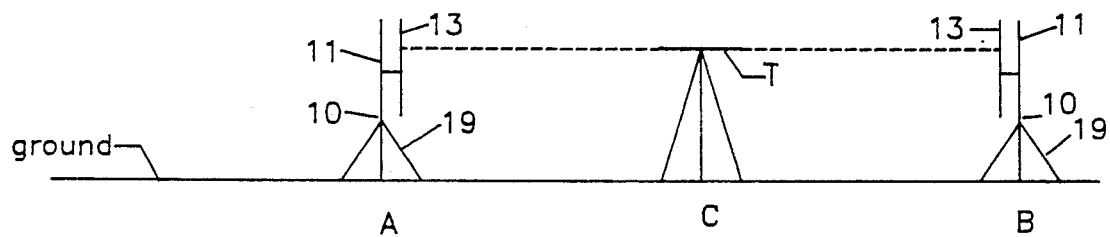
FIGS. 9 and 10 are similar views showing how two test apparatuses in accordance with this invention are used to perform the test method of this invention.

On the ground or a paved surface that is nearly level, erect two test apparatuses as just described and shown in FIGS. 1-7 on tripods at locations A and B about 200 feet apart (FIG. 9). The adjustable member 12 of each test apparatus is centered at this time—i.e., the marker line 21 on its sleeve 14 registers with the midpoint of the calibrated first scale 11 on its rod 10. The calibrated second scales 13 on the respective adjustable members of the test apparatuses at A and B face each other.

Put the transit, theodolite or other optical instrument T which is being tested midway between the two test apparatuses, as shown in FIG. 9. Care must be taken to level the optical instrument as accurately as possible, in accordance with known techniques. Point the instrument toward a first one of the test apparatuses (e.g., the apparatus at location A) and note the reading on its second scale 13. Then point the instrument toward the other, second test apparatus (the one at location B) and note the reading on its second scale 13. Next, on the second test apparatus (at B) remove the locking pin 26 from the sleeve 14 and the rod 10, loosen the clamping screw 15, if necessary, and slide the sleeve up or down along the rod until the marker line 21 on the sleeve registers with the scale reading on the first scale 11 of this second test apparatus that matches the scale reading which the optical instrument made on the second scale 13 of the first test apparatus (at A).

Figure 10:
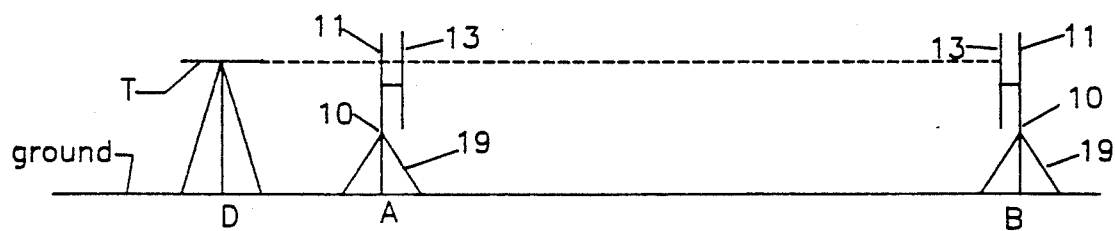

Now move the optical instrument to a position on the ground or other support surface within about 25 feet on the first test apparatus (at A) on the opposite side of it from the second test apparatus (at B), as shown in FIG. 10. This position of the optical instrument being checked should be chosen so that the respective scales on the test apparatus at A and B which face the instrument will both be visible. These are the first scale on the test apparatus at A and the second scale on the test apparatus at B. With the instrument level as before, use it to take readings on the first scale 11 of the nearer test apparatus (at A) and on the second scale 13 of the more remote test apparatus (at B). These two readings should be the same if the optical instrument is in proper adjustment. As an accuracy check, similar readings should be made in the opposite direction from a location near the test apparatus at B on the opposite side of it from the test apparatus at A.

It will be evident that the test apparatus and method of the present invention requires only one person to perform it, in contrast to the prior "peg adjustment" method which required at least two people to carry it out. The present test apparatus is readily portable, easy to erect and take down, and easy to use, as described.

We claim:

1. A leveling test apparatus for an optical instrument having a horizontal bubble level comprising:
   an elongated rod;
   means for holding said rod substantially vertical above a substantially level support surface;
   a vertically extending first scale on one side of said rod, said first scale being calibrated in predetermined increments of length and visible from said one side of said test apparatus;
   an elongated adjustable member;
   slider means having a close, sliding fit with all sides of said rod and rigidly connected to said adjustable member and holding said adjustable member closely parallel to said rod on the opposite side of said rod from said first scale thereon, said slider means adjustable positioning said adjustable member along said rod, said slider means carrying a marker adjacent said first scale which designates the position of said slider means along said first scale on said rod;
   and a vertically extending calibrated second scale on said adjustable member with the same increments of length as those of said first scale on said rod, said second scale on said adjustable member being visible on the opposite side of said test apparatus from said rod.

2. A test apparatus according to claim 1 and further comprising a bubble level operatively connected to said rod to indicate whether the rod is vertical.

3. A test apparatus according to claim 1 wherein said slider means comprises a sleeve slidable along the outside of said rod;
   said test apparatus further comprising a threadedly adjustable clamping screw on said sleeve selectively engageable with said rod to clamp the sleeve at a selected position along said rod.

4. A test apparatus according to claim 3 wherein:
   said sleeve has a wide first opening at which said first scale is visible;
   and said sleeve has said marker thereon adjacent said opening for designating a calibration on said first scale to show the position of said sleeve along said rod.

5. A test apparatus according to claim 4 wherein:
   said rod has a small opening therein at a predetermined point along said calibrated first scale on the rod;
   and said sleeve has a small second opening therein which registers with said opening in said rod at a centered position of said sleeve along said rod in which corresponding calibrations on said first and second scales are horizontally aligned;
   and further comprising a locking pin slidably insertable into said second opening in said sleeve and said opening in said rod to releasably lock said sleeve at said centered position along the rod.

6. A test apparatus according to claim 4 and further comprising a bubble level positioned on said rod to indicate whether said rod is vertical.

7. A test apparatus according to claim 3 wherein:
   said rod has a small opening therein at a predetermined point along said calibrated first scale on said rod;
   and said sleeve has a small second opening therein which registers with said opening in said rod at a centered position of said sleeve along said rod in which corresponding calibrations on said first and second scales are horizontally aligned;
   and further comprising a locking pin slidably insertable into said second opening in said sleeve and said opening in said rod to releasably lock said sleeve at said centered position along said rod.

8. A test apparatus according to claim 7 and further comprising a bubble level positioned on said rod to indicate whether the rod is vertical.

9. A leveling test apparatus for an optical instrument having a horizontal bubble level comprising:
   an elongated rod having an integral foot on its lower end for attachment to the top of a tripod;
   a bubble level on said foot for indicating whether said rod extends vertically;
   a first scale on one side of said rod calibrated in predetermined increments of length along said rod and visible from one side of said test apparatus;
   an elongated support member;
   a sleeve rigidly attached to said support member and having a close, sliding fit with the outside of said rod on all sides of the rod, said sleeve holding said support member parallel to said rod on the opposite side of said rod from said first scale thereon, said sleeve having a wide opening therein at which said first scale is visible, said sleeve having a marker thereon adjacent said opening for registration with a calibration on said first scale to designate the position of said sleeve along said first scale;
   a second scale on the opposite side of said support member from said rod, said second scale being calibrated in the same increments of length as said first scale and extending parallel to said first scale, said second scale being visible on the opposite side of said test apparatus from said first scale;
   and manually operable clamp means on said sleeve for releasably clamping said sleeve at a selected position along said rod.

10. A test apparatus according to claim 9 wherein:
    said rod has a small opening therein at a predetermined location along said first scale;
    said sleeve has a small second opening therein which registers with said opening in said rod at a centered position of said sleeve along said rod in which corresponding calibrations on said first and second scales are aligned horizontally;
    and further comprising a locking pin slidably insertable into said second opening in said sleeve and said opening in said rod to releasably lock said sleeve at said centered position along the rod.

11. A leveling test method for an optical instrument having a horizontal bubble level which comprises the steps of:

providing first and second test apparatuses, each having
- an elongated rod;
- means for holding said rod substantially vertical above a substantially level support surface;
- a vertically extending first scale on one side of said rod, said first scale being calibrated in predetermined increments of length and visible from one side of said test apparatus;
- an elongated adjustable member;
- slider means having a close, sliding fit with all sides of said rod and rigidly connected to said adjustable member and holding said adjustable member closely parallel to said rod on the opposite side of said rod from said first scale thereon, said slider means adjustable positioning said adjustable member along said rod, said slider means carrying a marker adjacent said first scale on said rod which designates the position of said slider means along said first scale on said rod;
- and a vertically extending calibrated second scale on said adjustable member with the same increments of length as those of said first scale on said rod, said second scale on said adjustable member being visible on the opposite side of said test apparatus from said rod;

positioning said first and second test apparatuses a substantial distance apart on a substantially level support surface, with their respective rods substantially vertical and with their respective second scales facing each other;

leveling said optical instrument at a location on said support surface substantially midway between said first and second apparatuses;

using said optical instrument to take readings on said second scales of said test apparatuses;

vertically adjusting said second scale of said second test apparatus along said first scale thereof to a position matching said reading on said second scale of said first test apparatus;

leveling said optical instrument on said support surface at the opposite side of one of said test apparatuses from the other test apparatus;

and using said optical instrument to take readings on said first scale of said one test apparatus and on said second scale of said other test apparatus.

* * * * *